(12) United States Patent
Motoda

(10) Patent No.: US 9,479,030 B2
(45) Date of Patent: Oct. 25, 2016

(54) ELECTRIC ACTUATOR WITH ELECTRIC MOTOR AND ELECTRIC CIRCUITS INCLUDINGS CONNECTING TERMINAL

(71) Applicant: Hitachi Automotive Systems, Ltd., Hitachinaka-shi, Ibaraki (JP)

(72) Inventor: Haruaki Motoda, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 714 days.

(21) Appl. No.: 13/834,224

(22) Filed: Mar. 15, 2013

(65) Prior Publication Data

US 2013/0249335 A1    Sep. 26, 2013

(30) Foreign Application Priority Data

Mar. 21, 2012   (JP) .................................. 2012-064312

(51) Int. Cl.

| | |
|---|---|
| *H02K 11/00* | (2016.01) |
| *H02K 7/10* | (2006.01) |
| *H01R 13/62* | (2006.01) |
| *H02K 15/00* | (2006.01) |
| *H02K 5/22* | (2006.01) |
| *B62D 5/04* | (2006.01) |
| *H01R 12/58* | (2011.01) |
| *H01R 13/11* | (2006.01) |

(52) U.S. Cl.
CPC ......... *H02K 11/0094* (2013.01); *B62D 5/0406* (2013.01); *H02K 5/225* (2013.01); *H02K 11/33* (2016.01); *H02K 15/00* (2013.01); *H01R 12/58* (2013.01); *H01R 13/112* (2013.01); *Y10T 29/49009* (2015.01)

(58) Field of Classification Search
CPC ....... H01R 13/15; H01R 43/02; H02K 5/225
USPC ........................... 310/71, 75 R, 98; 439/342
See application file for complete search history.

(56) References Cited

U.S. PATENT DOCUMENTS

| | | | |
|---|---|---|---|
| 7,946,878 B2 | 5/2011 | Lang et al. | |
| 2009/0042416 A1* | 2/2009 | Sigg ...................... | H01R 12/57 |
| | | | 439/78 |

FOREIGN PATENT DOCUMENTS

| | | | |
|---|---|---|---|
| JP | 1-116891 A | * | 8/1989 |
| JP | 01-116891 U | | 8/1989 |
| JP | 10334968 A | * | 12/1998 |

(Continued)

OTHER PUBLICATIONS

Machine Translation JP2007089267 (Apr. 2007).*

*Primary Examiner* — Jose Gonzalez Quinones
(74) *Attorney, Agent, or Firm* — Foley & Lardner LLP

(57) ABSTRACT

An electric actuator including a first electric circuit having a first connecting terminal, and a second electric circuit having a second connecting terminal electrically connected with the first connecting terminal, the first connecting terminal including a tip end portion having a rectangular flat plate shape, the second connecting terminal including a pair of elastic contact flaps opposed to each other with a clearance, the clearance having a width between tip end surfaces of the elastic contact flaps which is smaller than a thickness of the first connecting terminal. The first connecting terminal is retained such that the tip end portion thereof is clamped between the tip end surfaces of the elastic contact flaps of the second connecting terminal by an elastic restoring force of the elastic contact flaps.

8 Claims, 9 Drawing Sheets

(56) References Cited

FOREIGN PATENT DOCUMENTS

| JP | 11-054174 A | | 2/1999 |
|---|---|---|---|
| JP | 11054174 A | * | 2/1999 |
| JP | 11316384 A | * | 11/1999 |
| JP | 2007089267 A | * | 4/2007 |
| JP | 2010-028925 A | | 2/2010 |
| JP | 2010508646 A | | 3/2010 |
| JP | 2010-142028 A | | 6/2010 |

* cited by examiner

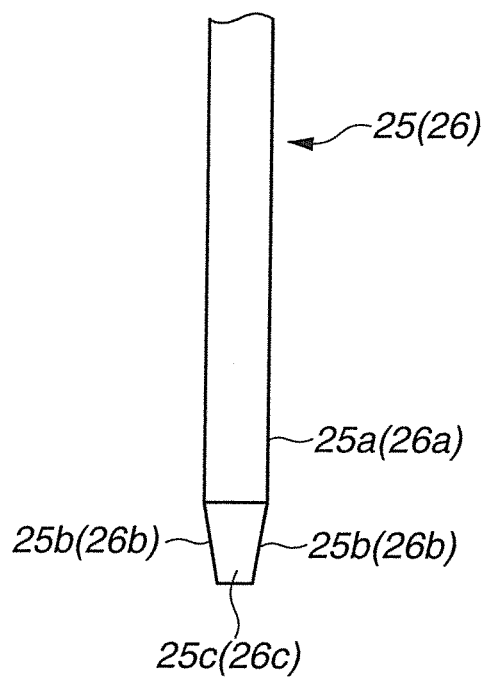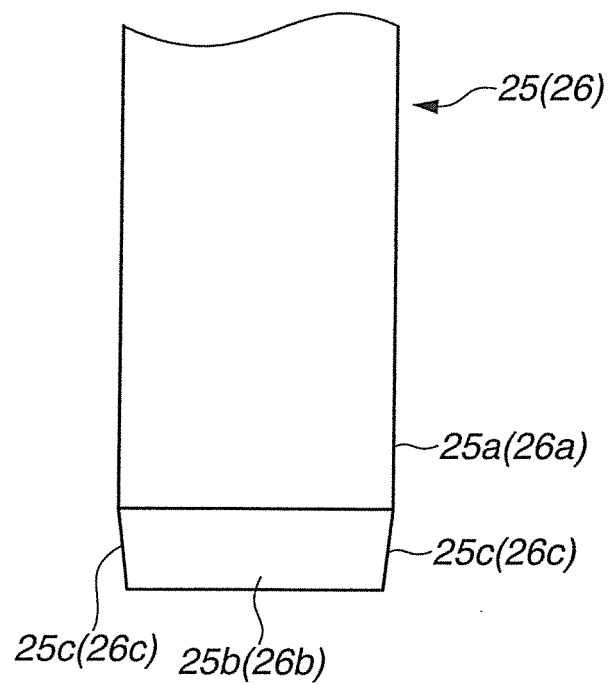

ELECTRIC ACTUATOR WITH ELECTRIC MOTOR AND ELECTRIC CIRCUITS INCLUDINGS CONNECTING TERMINAL

BACKGROUND OF THE INVENTION

The present invention relates to an electric actuator, for example, an electric actuator useable in an electric power steering apparatus of a vehicle.

As generally known, in an electric power steering apparatus of a vehicle, a rotational driving force of an electric motor as an electric actuator is used in order to assist a steering operation of a vehicle driver.

The electric motor is controlled by a control unit including electronic equipments such as a relay circuit, a capacitor, etc. A plurality of electric circuits such as a power circuit and a control circuit, are connected to the control unit through connecting terminals.

Japanese Patent Application Unexamined Publication No. 2010-508646 A discloses a connection apparatus including a first pressure contact element as a female terminal which has a strip-shaped resin-molded insertion web, and a second pressure contact element as a male terminal which has a flat plate shape having a fork-shaped tip end portion with an axially extending insertion slot. The first pressure contact element and the second pressure contact element are connected with each other by press-fitting the insertion web of the first pressure contact element into the insertion slot of the second pressure contact element while inserting the tip end portion of the second pressure contact element into a clearance in the first pressure contact element.

SUMMARY OF THE INVENTION

However, in the connection apparatus of the conventional art as described above, when the fork-shaped tip end portion of the second pressure contact element is pushed into the insertion web of the first pressure contact element through the insertion slot, the fork-shaped tip end portion is press-fitted into the insertion web while being plastically deformed in such a direction as to increase a distance between two fork teeth of the fork-shaped tip end portion. Therefore, an elastic force of the fork-shaped tip end portion which allows pressure contact between the fork-shaped tip end portion and the insertion web is relatively small. Unless the fork-shaped tip end portion is fully inserted into the insertion web to reach a predetermined insertion position, a large retaining force of the fork-shaped tip end portion relative to the insertion web cannot be obtained.

As a result, in a case where the fork-shaped tip end portion is not fully inserted, it is likely that an electric connection between the first pressure contact element and the second pressure contact element is deteriorated due to vibration or the like.

The present invention was made in view of the above-described problem of the conventional art. It is an object of the present invention to provide an electric actuator capable of ensuring a stable and strong electric connection between electric terminals.

In a first aspect of the present invention, there is provided an electric actuator for a vehicle, the electric actuator including an electric motor as a driving source, the electric actuator including:

a first electric circuit including a first connecting terminal; and a second electric circuit including a second connecting terminal electrically connected with the first connecting terminal, wherein the first connecting terminal includes a tip end portion having a rectangular flat plate shape, wherein the second connecting terminal includes a pair of elastic contact flaps opposed to each other with a clearance, the clearance having a width between tip end surfaces of the elastic contact flaps which is smaller than a thickness of the first connecting terminal, and wherein the first connecting terminal is retained such that the tip end portion thereof is clamped between the tip end surfaces of the elastic contact flaps of the second connecting terminal by an elastic restoring force of the elastic contact flaps.

The electric actuator according to the first aspect of the present invention can attain the following effect. When the tip end portion of the first connecting terminal is inserted into the clearance between the elastic contact flaps of the second connecting terminal against the elastic force of both of the elastic contact flaps, the tip end surfaces of the elastic contact flaps come into pressure contact with both side surfaces of the tip end portion of the first connecting terminal in a bite manner by the elastic restoring force of the elastic contact flaps. Therefore, stable and rigid connection between the first connecting terminal and the second connecting terminal can be obtained. As a result, it is possible to suppress deterioration in electrical connection between the first connecting terminal and the second connecting terminal.

In a second aspect of the present invention, there is provided the electric actuator according to the first aspect, further including guides disposed on both sides of the first connecting terminal in a width direction of the first connecting terminal, the guides serving to guide the tip end portion of the first connecting terminal into the clearance between the elastic contact flaps of the second connecting terminal.

In a third aspect of the present invention, there is provided the electric actuator according to the second aspect, further including a terminal holder made of a synthetic resin material, each of the elastic contact flaps of the second connecting terminal including a central portion molded in the terminal holder, the tip end surfaces of the elastic contact flaps being opposed to each other in a rectangular prism-shaped through hole formed in the terminal holder, wherein the guides are formed in inner surfaces that define the through hole, the inner surfaces being opposed to each other in a longitudinal direction of the clearance between the elastic contact flaps of the second connecting terminal, each of the guides being in the form of an elongated groove extending along a direction in which the first connecting terminal is inserted into the clearance.

The electric actuator according to the second and third aspects of the present invention can attain the following effect. The first connecting terminal can be guided toward the clearance by the guide portions. Therefore, it is possible to suppress occurrence of displacement of the first connecting terminal upon insertion thereof, thereby attaining smooth insertion of the first connecting terminal into the clearance.

In a fourth aspect of the present invention, there is provided the electric actuator according to the first aspect, wherein the tip end portion of the first connecting terminal has a first tapered surface on at least one of a pair of side surfaces thereof opposed to each other in a thickness direction of the first connecting terminal, the first tapered surface serving to guide the first connecting terminal into the clearance between the elastic contact flaps of the second connecting terminal.

In a fifth aspect of the present invention, there is provided the electric actuator according to the fourth aspect, wherein the tip end portion of the first connecting terminal has a second tapered surface on at least one of a pair of side surfaces thereof opposed to each other in a width direction perpendicular to the thickness direction of the first connecting terminal, the second tapered surface serving to guide the first connecting terminal into the clearance between the elastic contact flaps of the second connecting terminal.

In a sixth aspect of the present invention, there is provided the electric actuator according to the first aspect, wherein the elastic contact flaps of the second connecting terminal are located in substantially horizontal alignment with each other before the first connecting terminal is inserted into the clearance between the elastic contact flaps of the second connecting terminal.

In a seventh aspect of the present invention, there is provided the electric actuator according to the first aspect, wherein a pair of cutout portions are formed in both side edges of a root portion of each of the elastic contact flaps of the second connecting terminal.

In an eighth aspect of the present invention, there is provided the electric actuator according to the first aspect, wherein an adhesive is applied to a vicinity of the tip end surfaces of the elastic contact flaps of the second connecting terminal before the tip end portion of the first connecting terminal is inserted into the clearance between the elastic contact flaps of the second connecting terminal.

In a ninth aspect of the present invention, there is provided the electric actuator according to the first aspect, wherein an adhesive is applied so as to fill the clearance between the elastic contact flaps of the second connecting terminal, before the tip end portion of the first connecting terminal is inserted into the clearance between the elastic contact flaps of the second connecting terminal.

In a tenth aspect of the present invention, there is provided a method of producing an electric actuator for a vehicle, the electric actuator including a first electric circuit including a first connecting terminal, and a second electric circuit including a second connecting terminal electrically connected with the first connecting terminal, the second connecting terminal including a pair of elastic contact flaps, the method including:

a first step of resin-molding the second connecting terminal such that the elastic contact flaps of the second connecting terminal are opposed to each other with a clearance, the clearance having a width between tip end surfaces of the elastic contact flaps which is smaller than a thickness of the first connecting terminal, a second step of filling the clearance with an adhesive; and a third step of connecting the first connecting terminal to the second connecting terminal by inserting the first connecting terminal into the clearance filled with the adhesive.

Other objects and features of this invention will become understood from the following description with reference to the accompanying drawings.

BRIEF DESCRIPTION OF THE DRAWINGS

FIG. 10A is one side view of a current-carrying terminal of the electric actuator according to the first embodiment of the present invention.

FIG. 10B is another side view of the current-carrying terminal of the electric actuator according to the first embodiment of the present invention.

DETAILED DESCRIPTION OF THE INVENTION

An electric actuator according to embodiments of the present invention, which is applied to an electric power steering apparatus of an automobile, will be explained in detail by referring to FIG. 1 to FIG. 10B.

First Embodiment

Figure 3:
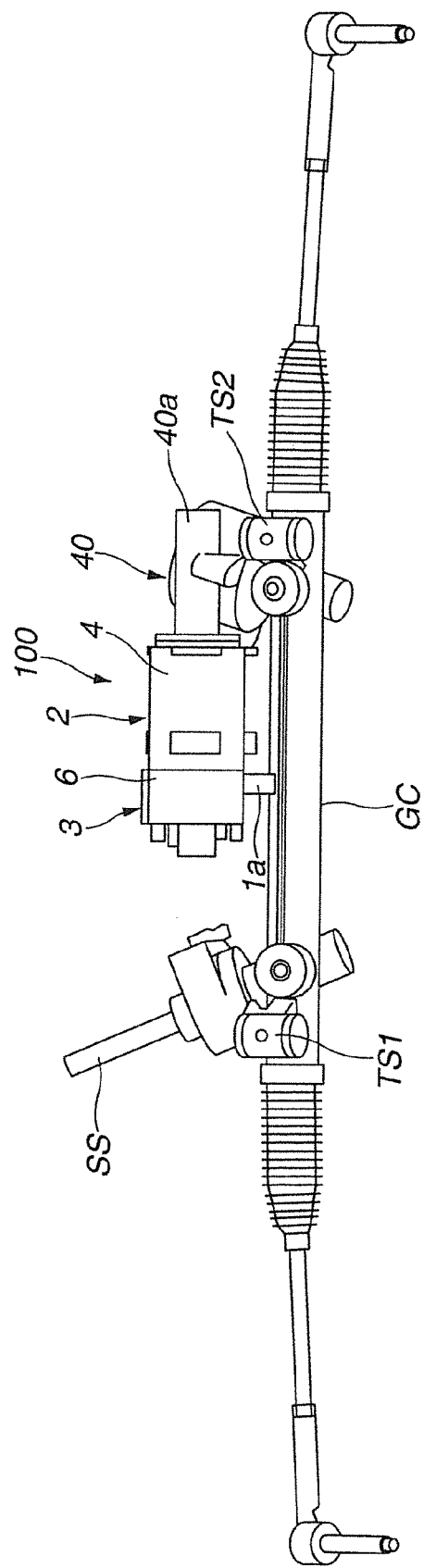
FIG. 3 is a schematic side view of an electric power steering apparatus to which the electric actuator according to the first embodiment of the present invention is applicable.

As shown in FIG. 3, the electric power steering apparatus includes gear case GC that is disposed on the side of a tip end of steering shaft SS and accommodates a rack and pinion mechanism therein. First torque sensor TS1 that detects a torque of the steering shaft SS is disposed on one end portion of the gear case GC in which a tip end of the steering shaft SS is located. Electric actuator 100 that assists a rotating force of the steering shaft SS is disposed on the side of the gear case GC through bracket 1a. Second torque sensor TS2 that detects a torque of electric actuator 100 is disposed on the other end portion of the gear case GC.

Figure 4:
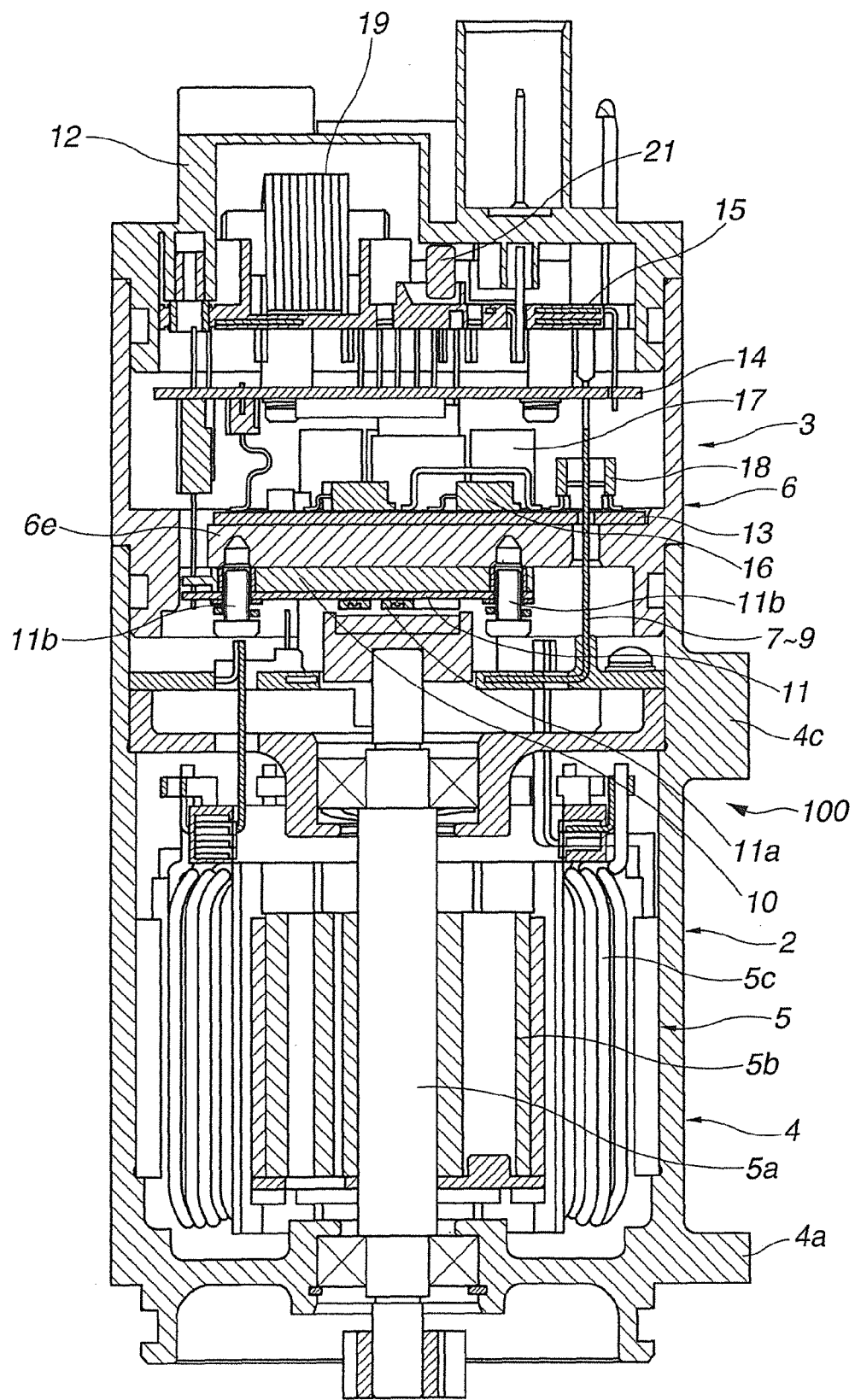
FIG. 4 is a vertical cross section of the electric actuator according to the first embodiment of the present invention.
Figure 5:
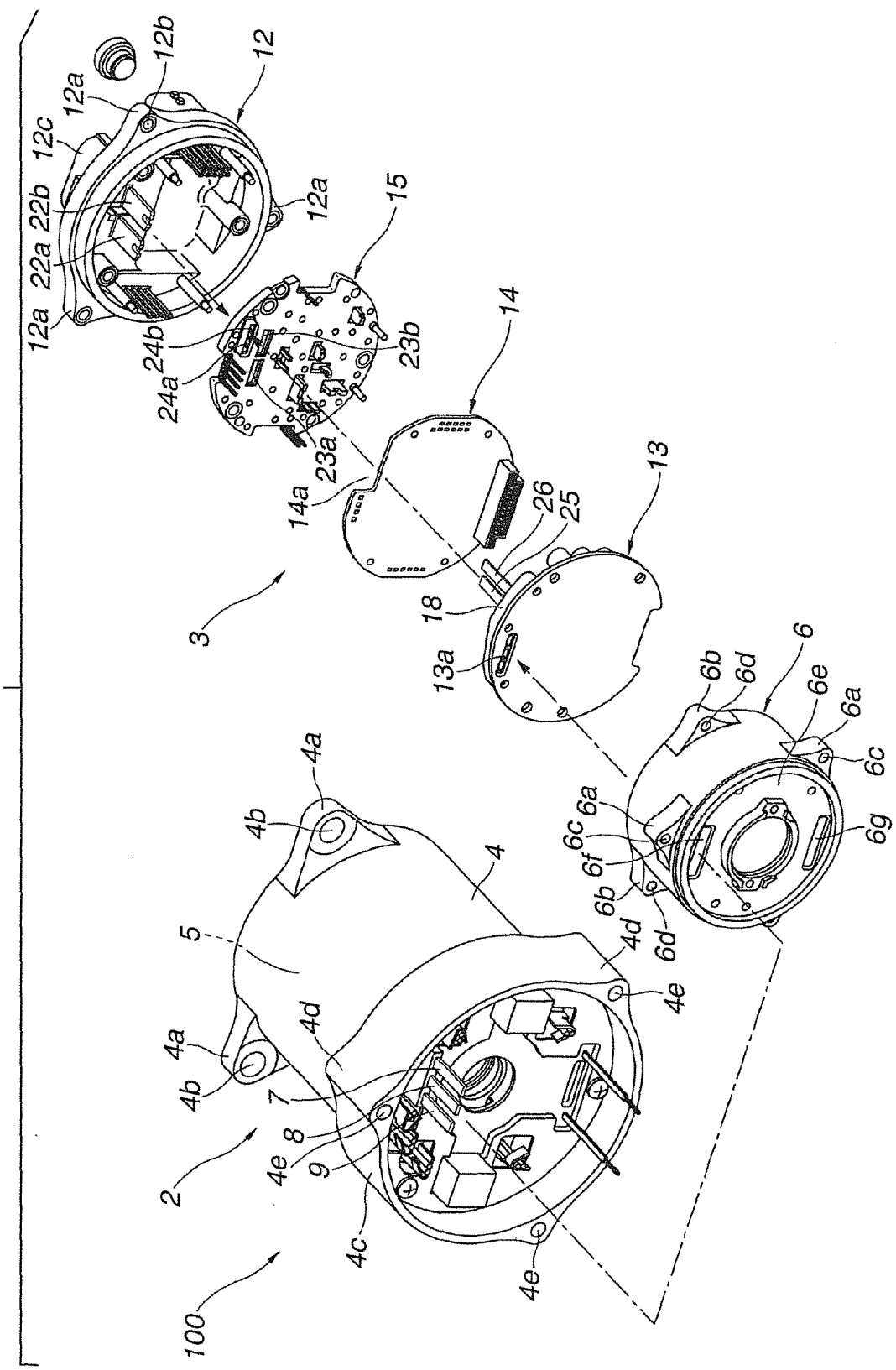
FIG. 5 is an exploded perspective view of the electric actuator according to the first embodiment of the present invention.

As shown in FIG. 3 to FIG. 5, electric actuator 100 includes motor unit 2 disposed on a central portion of electric actuator 100, control unit (ECU) 3 disposed on the side of one end of motor unit 2, and reduction mechanism 40 disposed on the side of the other end of motor unit 2.

Motor unit 2 includes motor housing 4 and electric motor 5 accommodated in motor housing 4. ECU 3 includes ECU housing 6, and a plurality of circuit board that are accommodated in ECU housing 6 and serve to control rotation of electric motor 5.

Motor housing 4 is formed into a cylindrical shape having one closed end, and has three boss portions 4a on an outer periphery of one axial end portion thereof. Boss portions 4a are formed integrally with motor housing 4, and have mount holes 4b, respectively. Motor housing 4 is mounted to reduction mechanism 40 through bolts (not shown) which are inserted into mount holes 4b. Motor housing 4 also has large diameter portion 4c on an outer periphery of the other axial end portion thereof, and three boss portions 4d formed on large diameter portion 4c. Boss portions 4d are formed integrally with motor housing 4, and have bolt holes 4e, respectively. Motor housing 4 is connected to ECU housing 6 along a direction of an axis of motor shaft 5a through bolts (not shown) which are inserted into bolt holes 4e.

As shown in FIG. 4, electric motor 5 accommodated in motor housing 4 includes motor shaft 5a, rotor 5b fixed to an outer periphery of motor shaft 5a, and stator 5c disposed on an outer peripheral side of rotor 5b with a predetermined clearance. Stator 5c has windings and serves as first electric circuit.

Electrically connected to stator 5c are three-phase terminals 7, 8, 9 as first connecting terminals. As shown in FIG. 5, three-phase terminals 7, 8, 9 extend from the side of large diameter portion 4c toward an inside of ECU housing 6 in a parallel relation to each other.

Sensor retaining plate 10 is disposed on the side of a front end of motor shaft 5a. Sensor substrate 11 is fixed to sensor retaining plate 10 through a plurality of screws 11b. Sensor substrate 11 is provided with rotational speed sensor 11a that detects rotational speed of motor shaft 5a.

ECU housing 6 is formed into a cylindrical shape having one closed end. Cover 12 is fixed to the other end of ECU housing 6 by means of bolts (not shown), thereby closing an opening of the other end. In ECU housing 6, among the plurality of circuit boards, inverter board 13, control circuit board 14 and resin busbar board 15 are accommodated in a stacked state. Inverter board 13, control circuit board 14 and resin busbar board 15 serve as a second electric circuit.

ECU housing 6 has three boss portions 6a on an outer periphery of a front end thereof, and three boss portions 6b on an outer periphery of a rear end thereof. These boss portions 6a, 6b are disposed on angular positions angularly spaced by 120 degrees from each other in a circumferential direction of ECU housing 6. Boss portions 6a, 6b are formed with bolt holes 6c, 6d, respectively. Similarly, cover 12 has three boss portions 12a on an outer periphery thereof which are disposed on angular positions angularly spaced by 120 degrees from each other in a circumferential direction of cover 12. Boss portions 12a are formed with bolt holes 12b. ECU housing 6, motor housing 4 and cover 12 are coupled to each other and joined together through a plurality of bolts (not shown) which are inserted into bolt holes 6c, 6d, 4e, 12b.

ECU housing 6 also has two rectangular windows 6f, 6g that extend through bottom wall 6e. Windows 6f, 6g are disposed on the outer peripheral side of bottom wall 6e in a diametrically opposed relation to each other.

Figure 6:
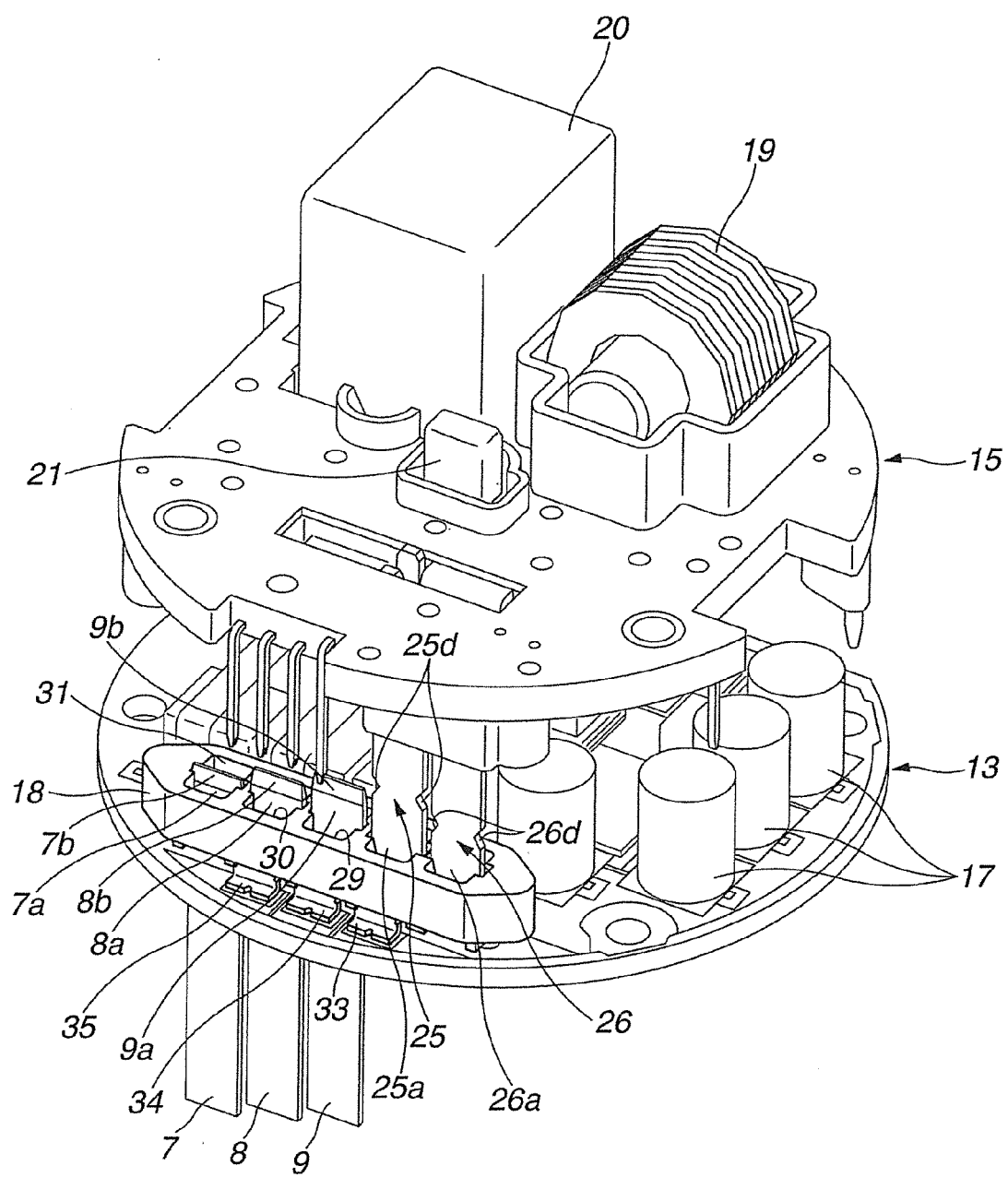
FIG. 6 is a perspective view of the essential part of the electric actuator according to the first embodiment of the present invention.

Inverter board 13 serves as an electric power conversion circuit board. As shown in FIG. 4 and FIG. 6, electronic components such as MOSFET 16 as a solid state switching element which controls rotation of electric motor 5, and electrolytic capacitor 17 for reducing noise are mounted onto one end surface of inverter board 13. Terminal holder 18 made of a synthetic resin material is fixedly mounted to an outer peripheral portion of the one end surface of inverter board 13. As shown in FIG. 5, inverter board 13 has elongated rectangular window 13a that is formed in a position corresponding to terminal holder 18 through inverter board 13.

Control circuit board 14 serves to control MOSFET 16, and has a microcomputer (not shown) mounted thereto.

Resin busbar board 15 serves as an electric power circuit board. As shown in FIG. 6, electronic components such as coil 19 for reducing noise, power relay 20, and aluminum capacitor 21 for reducing noise, are mounted onto an upper surface of resin busbar board 15. Power relay 20 is turned on to allow electric current supply to electric motor 5, and is turned off to interrupt the electric current supply to electric motor 5 by on-off changeover of an ignition switch.

As shown in FIG. 5, cover 12 includes connector 12c formed integrally with cover 12 on the side of one end thereof. Connector 12c is connected to a battery power source (not shown), through which electric power is supplied to inverter board 13, control circuit board 14, resin busbar board 15, and electric motor 5.

A specific construction to supply electric power to electric motor 5 is explained in detail hereinafter. As shown in FIG. 5, two flat plate-shaped male first power terminals 22a, 22b are fixed to cover 12. Each of first power terminals 22a, 22b has a base end portion fixedly connected to connector 12c, and a tip end portion that is inserted into and welded to female second power terminals 23a, 23b disposed on resin busbar board 15.

As shown in FIG. 5, resin busbar board 15 is provided with a pair of female current-carrying terminals 24a, 24b disposed on an upper side of second power terminals 23a, 23b. Current-carrying terminals 24a, 24b are connected to second power terminals 23a, 23b through busbars.

On the other hand, terminal holder 18 of inverter board 13 includes a pair of male positive electrode current-carrying terminal 25 and negative electrode current-carrying terminal 26 which are disposed to project toward resin busbar board 15. Current-carrying terminals 25, 26 are connected to current-carrying terminals 24a, 24b through cutout portion 14a formed on an outer peripheral portion of control circuit board 14.

Figure 7:
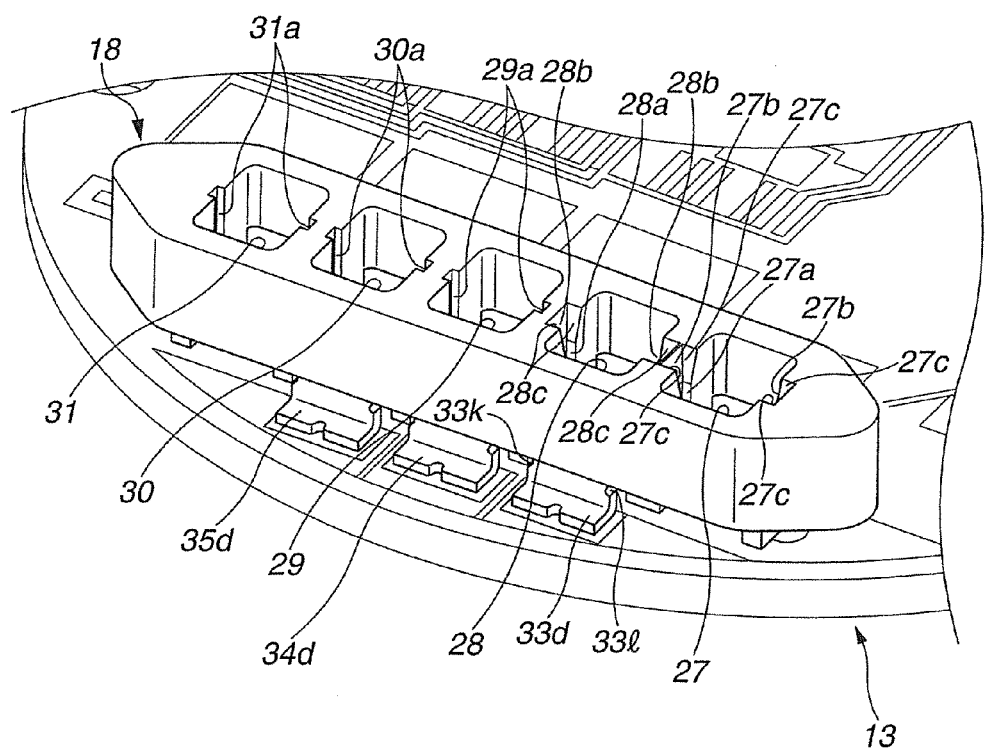
FIG. 7 is a perspective view of a terminal holder used in the electric actuator according to the first embodiment of the present invention.
Figure 8:
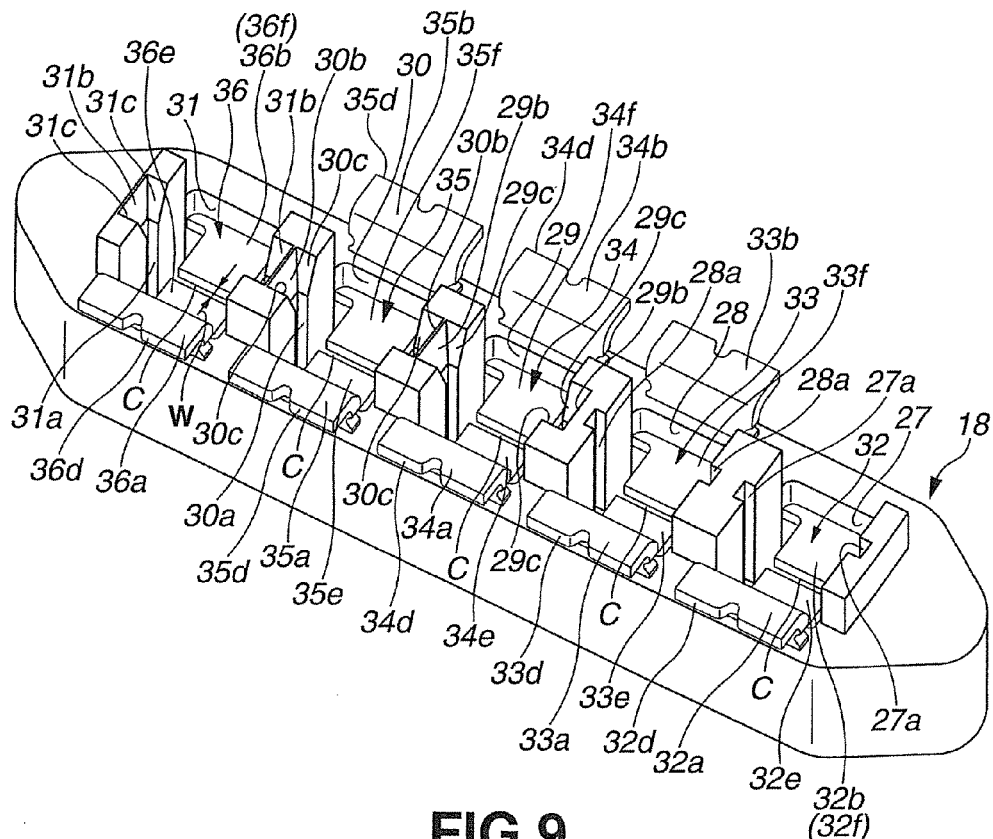
FIG. 8 is a perspective view of the terminal holder, taken from the side of a bottom surface thereof.

As shown in FIG. 6 to FIG. 8, terminal holder 18 of inverter board 13 has an elongated rectangular frame shape, and are formed with five prism-shaped through holes 27, 28, 29, 30, 31. Five female terminals 32, 33, 34, 35, 36 as second connecting terminal are fixedly disposed in through holes 27-31, respectively. Current-carrying terminals 25, 26 are previously connected to two female terminals 32, 33 on a right side in FIG. 7 and FIG. 8. Three-phase terminals 7, 8, 9 of electric motor 5 are connected to three female terminals 34, 35, 36 on a left side in FIG. 7 and FIG. 8 through window 6f of ECU housing 6 and window 13a of inverter board 13.

Specifically, as shown in FIG. 6 to FIG. 8, terminal holder 18 is fixed to an outer peripheral side of one end surface of inverter board 13. A pair of elongated guide grooves 27a, 28a, 29a, 30a, 31a are formed in inner surfaces that defines through holes 27-31 and are opposed to each other in a longitudinal direction of terminal holder 18. Guide grooves 27a-31a extend in a vertical direction (in an up-and-down direction) of terminal holder 18. That is, respective guide grooves 27a-31a are formed upwardly and downwardly with respect to respective clearances C between opposed split parts of respective female terminals 32-36 as described later. Three-phase terminals 7-9 and current-carrying terminals 25, 26 are inserted into female terminals 32-36 through guide grooves 27a-31a.

Figure 1:
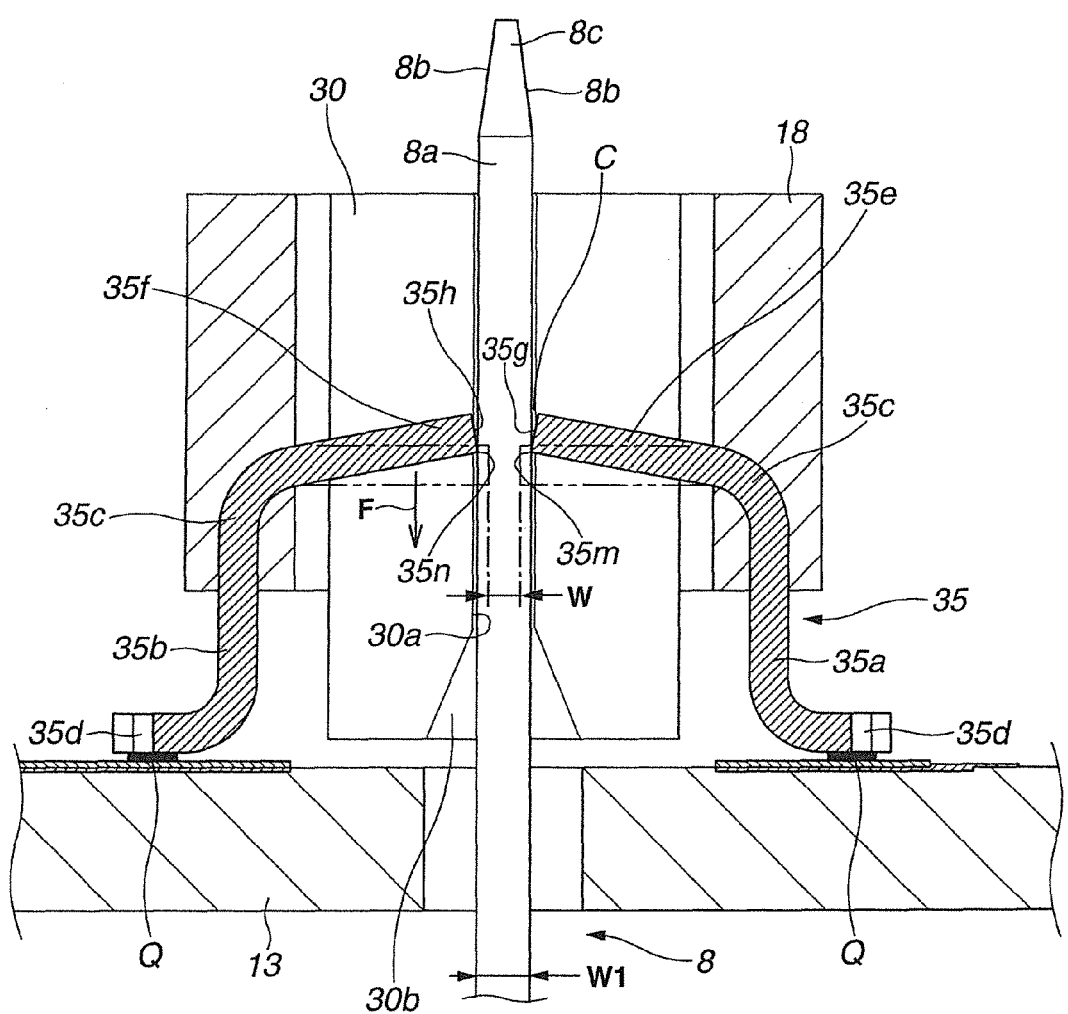
FIG. 1 is a vertical cross section of an essential part of an electric actuator according to a first embodiment of the present invention.

As shown in FIG. 7, dovetail-shaped tapered guide surfaces 27b, 27c, 28b, 28c are formed on opposed end edges of respective guide grooves 27a, 28a into which current-carrying terminals 25, 26 are inserted. On the other hand, as shown in FIG. 8, dovetail-shaped tapered guide surfaces 29b, 29c, 30b, 30c, 31b, 31c are formed on opposed end edges of respective guide grooves 29a-31a into which three-phase terminals 7-9 are inserted. A portion of terminal holder 18 in which each of guide grooves 27a-31a is formed is disposed to project downwardly (toward the side of inverter board 13) as shown in FIG. 1 and FIG. 8.

Female terminals 32-36 are formed by bending a elastically deformable metal plate such as a copper plate. As shown in FIG. 1 and FIG. 8, each of female terminals 32-36 are constituted of two split parts 32a, 32b, 33a, 33b, 34a, 34b, 35a, 35b, 36a, 36b split at a center thereof in a width direction of terminal holder 18 which extends perpendicular to the longitudinal direction thereof. That is, each pair of split parts 32a, 32b, 33a, 33b, 34a, 34b, 35a, 35b, 36a, 36b are opposed to each other in the width direction of terminal holder 18. Each of split parts 32a-36b has a crank-like bent shape in side view. These split parts 32a-36b have central portions 32c-36c which are molded in terminal holder 18 and fixed thereto upon resin molding of terminal holder 18. Split parts 32b, 36b as one of each pair of the opposed split parts of female terminals 32, 36 located on the side of both ends of terminal holder 18 in the longitudinal direction are formed into a generally flat shape without being fixed to inverter board 13 on one side thereof, and are molded in terminal holder 18 on the other side thereof.

Further, split parts 32a, 33a, 33b to 35a, 35b, 36a of female terminals 32-36 include generally L-shaped bent base end portions 32d-36d each having bottom surfaces fixed at solder Q to an upper surface of busbar (wiring pattern) 13b that is exposed to an upper surface of inverter board 13. However, split parts 32b, 36b as one of each pair of the opposed split parts of female terminals 32, 36 which have no base end portion are molded in terminal holder 18, and therefore, split parts 32b, 36b are not fixed to the upper surface of inverter board 13 by soldering. Split parts 33b, 34b, 35b as one of each pair of the opposed split parts of female terminals 33, 34, 35 disposed at a central portion of terminal holder 18 in the longitudinal direction include base end portions 33d, 34d, 35d each having bottom surfaces fixed at solder Q to a copper plate that is exposed to the upper surface of inverter board 13. Thus, split parts 33b, 34b, 35b are soldered in order to merely ensure a fixing strength thereof, but do not serve for connection with other circuits.

Further, split parts 32a-36b of female terminals 32-36 respectively include tip end portions 32e, 32f, 33e, 33f, 34e, 34f, 35e, 35f, 36e, 36f which serve as elastic contact flaps. For the sake of exemplary explanation of tip end portions 32e-36f, tip end portions 35e, 35f of split parts 35a, 35b of female terminal 35 are explained. As shown in FIG. 1, tip end portions 35e, 35f are located in substantially horizontal alignment with each other such that flat tip end surfaces 35g, 35h thereof are opposed to each other with clearance C therebetween as indicated by broken line, before three-phase terminal 8 is inserted into the clearance C. The clearance C is a predetermined fine clearance elongated along the longitudinal direction of terminal holder 18, and has substantially uniform width W that extends between tip end surfaces 35g, 35h of tip end portions 35e, 35f of split parts 35a, 35b of female terminal 35. The width W is set to be slightly smaller than thickness W1 of three-phase terminal 8. Similarly, the clearance C is formed between each pair of opposed tip end portions 32e, 32f, 33e, 33f, 34e, 34f, 36e, 36f of split parts 32a, 32b, 33a, 33b, 34a, 34b, 36a, 36b, and has substantially uniform width W between the tip end surfaces of opposed tip end portions 32e, 32f, 33e, 33f, 34e, 34f, 36e, 36f which is set to be slightly smaller than thickness W1 of each of terminals 7, 9, 25, 26.

Figure 2:
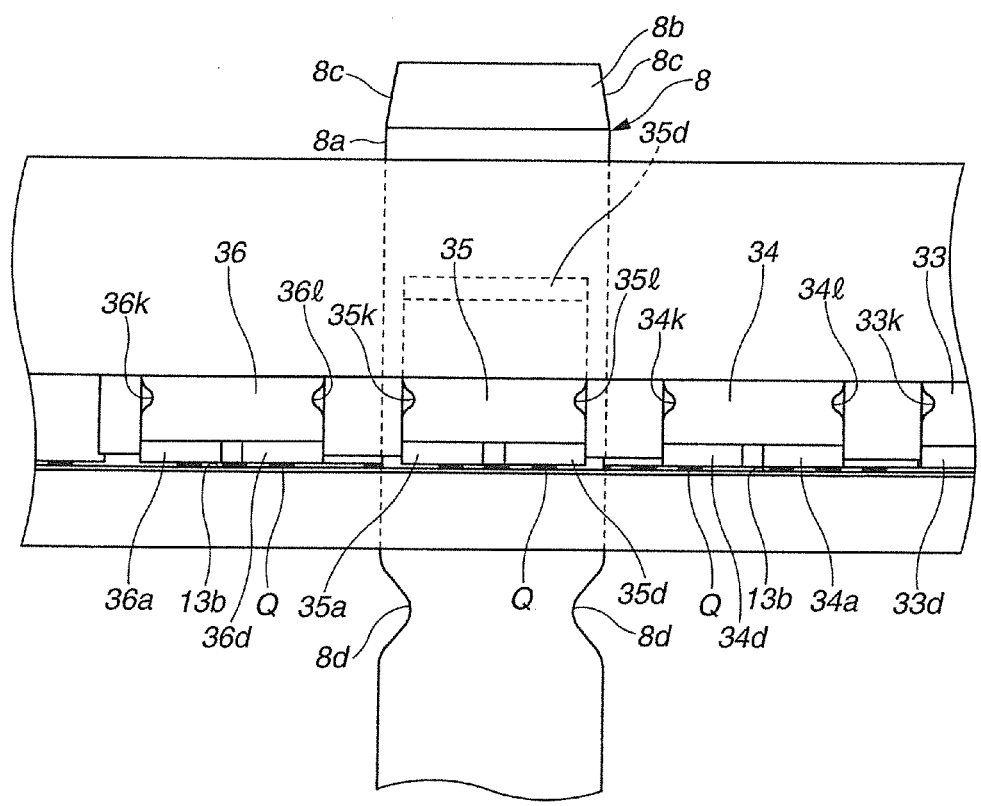
FIG. 2 is a vertical cross section of the essential part of the electric actuator according to the first embodiment of the present invention, taken in a direction perpendicular to the vertical cross section of FIG. 1.

For the sake of exemplary explanation of construction of three-phase terminals 7-9 and current-carrying terminals 25, 26, one three-phase terminal 8 is explained. As shown in FIG. 1 and FIG. 2, three-phase terminal 8 has an elongated flat plate shape, and includes tip end portion 8a having a rectangular shape in cross section. Tip end portion 8a includes a tapered distal end portion having one pair of first tapered surfaces 8b opposed to each other in the thickness W1 direction of three-phase terminal 8, and the other pair of second tapered surfaces 8c opposed each other in a direction (width direction of three-phase terminal 8) perpendicular to the thickness W1 direction. As shown in FIG. 2, tip end portion 8a also has a pair of cutout grooves 8d, 8d that are formed on both side edges on the side of a base end portion thereof (i.e., on the side of motor housing 4) and opposed to each other in the width direction of three-phase terminal 8. Other three-phase terminals 7, 9 also have the same configuration as that of three-phase terminal 8 as described above. Three-phase terminals 7, 9 each have tip end portions 7a, 9a that are of a rectangular shape in cross section and include tapered distal end portions. The tapered distal end portions of tip end portions 7a, 9a have one pair of first tapered surfaces 7b, 9b opposed to each other in a thickness direction of three-phase terminals 7, 9, and the other pair of second tapered surfaces 7c, 9c opposed to each other in a direction (width direction of three-phase terminals 7, 9) perpendicular to the thickness direction. Tip end portions 7a, 9a also have cutout grooves 7d, 9d that are formed on both side edges on the side of base end portions thereof (i.e., on the side of motor housing 4) and opposed to each other in the width direction of three-phase terminals 7, 9. Similarly, current-carrying terminals 25, 26 have the same configuration as those of three-phase terminals 7-9 as described above. As shown in FIGS. 10A and 10B, current-carrying terminals 25, 26 each include base end portions 25a, 26a that are of a rectangular shape in cross section and include tapered distal end portions. The tapered distal end portions of base end portions 25a, 26a have one pair of first tapered surfaces 25b, 26b opposed to each other in a thickness direction of current-carrying terminals 25, 26 and the other pair of second tapered surfaces 25c, 26c opposed to each other in a direction (width direction of current-carrying terminals 25, 26) perpendicular to the thickness direction. Base end portions 25a, 26a each include cutout grooves 25d, 26d formed on both side edges of base end portions 25a, 26a in an opposed relation to each other in the width direction of current-carrying terminals 25, 26.

As shown in FIG. 2, L-shaped base end portions 32d-36d of female terminals 32-36 have a pair of semi-circular cutout grooves 32k, 32l, 33k, 33l, 34k, 34l, 35k, 35l, 36k, 36l on both side edges opposed to each other in a width direction thereof along the longitudinal direction of terminal holder 18.

Meanwhile, reduction mechanism 40 includes a plurality of gears accommodated within casing 40a shown in FIG. 1, and serves to reduce rotational speed inputted from electric motor 5 and transmit the reduced rotation to the rack and pinion mechanism.

Operation of First Embodiment

An operation of the electric actuator of the first embodiment will be explained hereinafter. Basically, an operation of connecting three-phase terminals 7-9 to corresponding female terminals 34-36 of terminal holder 18 is explained. An operation of connecting current-carrying terminals 25, 26 to corresponding female terminals 32, 33 is same as that of connecting three-phase terminals 7-9 to corresponding female terminals 34-36, and therefore, detailed explanations therefor are omitted.

Specifically, when motor housing 4, ECU housing 6, and cover 12 are assembled together, as shown in FIG. 5, firstly, the pair of current-carrying terminals 25, 26 are connected to terminal holder 18 by inserting base end portions 25a, 26a thereof into the respective clearances C between tip end portions 32e, 32f of split parts 32a, 32b of female terminal 32 and tip end portions 33e, 33f of split parts 33a, 33b of female terminal 33. In this state, three-phase terminals 7-9 are connected to female terminals 34-36 through window 6f of ECU housing 6 and window 13a of inverter board 13 in the following manner. For the sake of simple illustration, an operation of connecting one three-phase terminal 8 to female terminal 35 is explained. Tip end portion 8a of three-phase terminal 8 as shown in FIG. 1 is inserted into both guide grooves 30a, 30a of terminal holder 18 by sliding second tapered surfaces 8c, 8c thereof on tapered guide surfaces 30b, 30b of terminal holder 18, and then pushed along both guide grooves 30a, 30a so that tip end portion 8a is smoothly entered into the clearance C between opposed tip end portions 35e, 35f of split parts 35a, 35b of female terminal 35 through first tapered surfaces 8b, 8b.

Subsequently, when tip end portion 8a of three-phase terminal 8 is further pushed into the clearance C, both tip end portions 35e, 35f of split parts 35a, 35b of female terminal 35 permit tip end portion 8a to be further inserted into the clearance C, while being flexibly deformed in a direction in which tip end portions 35e, 35f are farther spaced from each other (i.e., in the open direction) against an elastic reaction force thereof. That is, tip end portion 8a can be inserted into the clearance C by a predetermined amount while the both side surfaces of tip end portion 8a are slid on tip end surfaces 35g, 35h of opposed tip end portions 35e, 35f of split parts 35a, 35b of female terminal 35. As a result, three-phase terminal 8 can be retained such that tip end portion 8a is sandwiched or clamped between tip end surfaces 35g, 35h of opposed tip end portions 35e, 35f due to an elastic restoring force of opposed tip end portions 35e, 35f of split parts 35a, 35b of female terminal 35. Specifically, in this state, lower end edges 35m, 35n of tip end surfaces 35g, 35h which are opposed to the both side surfaces of tip end portion 8a are brought into pressure contact with the both side surfaces of tip end portion 8a in a bite manner.

Particularly, in a case where force F acts on three-phase terminal 8 in a direction in which three-phase terminal 8 is removed from female terminal 35 as indicated by arrow in FIG. 1, lower end edges 35m, 35n of tip end surfaces 35g, 35h are urged to further bite into the both side surfaces of tip end portion 8a due to reaction force of opposed tip end portions 35e, 35f of split parts 35a, 35b of female terminal 35. Therefore, three-phase terminal 8 can be stably and rigidly connected to female terminal 35. As a result, electrical connection of three-phase terminal 8 with female terminal 35 can be enhanced.

Further, an allowance of insertion (insertion position) of three-phase terminal 8 relative to female terminal 35 can be increased, thereby facilitating the insertion operation and reducing the production cost. That is, even in a case where the connecting position of three-phase terminal 8 and female terminal 35 is displaced in an axial direction of three-phase terminal 8 due to variation in length of three-phase terminal 8 or variation in height of female terminal 35, the rigid connection therebetween can be attained to thereby accept displacement of the connecting position thereof.

As described above, when three-phase terminals 7, 8, 9 are inserted into the respective clearances C between opposed tip end portions 34e, 34f, 35e, 35f, 36e, 36f of split parts 34a, 34b, 35a, 35b, 36a, 36b of female terminals 34, 35, 36, three-phase terminals 7-9 can be fixedly retained such that tip end portions 7a-9a are clamped between the tip end surfaces of tip end portions 34e, 34f to 36e, 36f in the bitten manner. As a result, three-phase terminals 7-9 can be stably and rigidly connected to female terminals 34-36.

Further, current-carrying terminals 25, 26 and female terminals 32, 33 have the same construction as that of three-phase terminals 7-9 and female terminals 34-36, and therefore, stable and rigid connection of current-carrying terminals 25, 26 with female terminals 32, 33 can be attained.

Further, in this embodiment, guide grooves 27a-31a and tapered guide surfaces 27b, 27c to 31b, 31c are formed in the peripheral surfaces defining through holes 27-31. With this construction, tip end portions 7a-9a of three-phase terminals 7-9 and tip end portions 25a, 26a of current-carrying terminals 25, 26 can be guided into the respective clearance C with high accuracy. As a result, a load that is exerted on three-phase terminals 7-9 and current-carrying terminals 25, 26 upon insertion thereof can be reduced so that the insertion operation can be remarkably facilitated.

Further, tip end portions 7a-9a of three-phase terminals 7-9 are respectively formed with first tapered surfaces 7b-9b and second tapered surfaces 7c-9c, and base end portions 25a, 26a of current-carrying terminals 25, 26 are respectively formed with first tapered surfaces 25b, 26b and second tapered surfaces 25c, 26c. First tapered surfaces 7b-9b, 25b, 26b and second tapered surfaces 7c-9c, 25c, 26c cooperate with guide grooves 27a-31a to facilitate smooth insertion of three-phase terminals 7-9 and current-carrying terminals 25, 26 into the respective clearances C between opposed tip end portions 32e, 32f to 36e, 36f of split parts 32a, 32b to 36a, 36b of female terminals 32-36.

Furthermore, as shown in FIG. 2, base end portions 32d-36d of female terminals 32-36 are respectively formed with the pairs of cutout grooves 32k, 32l to 36k, 36l. With the provision of the pairs of cutout grooves 32k, 32l to 36k, 36l, when three-phase terminals 7-9 and current-carrying terminals 25, 26 are inserted into the corresponding clearances C, base end portions 32d-36d are slightly deformed to thereby relax stress concentratedly exerted on base end portions 32d-36d (solder portions Q).

Specifically, when inserting three-phase terminals 7-9 and current-carrying terminals 25, 26 into through holes 27-31 of terminal holder 18, tip end portions 7a-9a and base end portions 25a, 26a are contacted with tapered guide surfaces 29b, 29c to 31b, 31c and 27b, 27c, 28b, 28c, and these terminals 7-9, 25, 26 press terminal holder 18 in the insertion direction, so that an insertion load is exerted on base end portions 32d-36d.

With the provision of the pairs of cutout grooves 32k, 32l to 36k, 36l, the stress caused due to the insertion load upon inserting respective terminals 7-9, 25, 26 into through holes 27-31 can be distributed to the pairs of cutout grooves 32k, 32l to 36k, 36l, so that the stress concentratedly exerted on base end portions 32d-36d can be relaxed.

Specifically, when first tapered surfaces 7b-9b and second tapered surfaces 7c-9c of three-phase terminals 7-9 are inserted into the respective clearances C between opposed tip end portions 34e, 34f to 36e, 36f of split parts 34a, 34b to 36a, 36b of female terminals 34-36 upon insertion of three-phase terminals 7-9 relative to female terminals 34-36, an insertion load is exerted on base end portions 34d-36d in the insertion direction of three-phase terminals 7-9, thereby applying a stress to base end portions 34d-36d in such a direction that the solder portions Q are lifted up. Therefore, there is a fear that durability and retention force of the solder portions Q are deteriorated to thereby cause peel-off of the solder. In contrast, in this embodiment of the present invention, with the provision of cutout grooves 34k, 34l to 36k, 36l, the stress applied to base end portions 32d-36d can be distributed and absorbed in such a way that the peripheral portions of cutout grooves 34k, 34l to 36k, 36l are pulled. As a result, the stress concentrated to base end portions 34d-36d can be relaxed.

On the other hand, when current-carrying terminals 25, 26 are inserted into the clearances C between opposed tip end portions 32e, 32f and 33e, 33f of split parts 32a, 32b and 33a, 33b of female terminals 32 and 33, respectively, a stress is applied to base end portions 32d, 33d such that the solder portions Q are pressed downwardly. Therefore, there is a fear that base end portions 32d, 33d suffer from compression deformation to thereby deteriorate durability and retention force of the solder portions Q. However, in this embodiment, with the provision of cutout grooves 32k, 32l and 33k, 33l, the stress applied to base end portions 32d, 33d can be distributed and absorbed in such a way that peripheral portions of cutout grooves 32k, 32l and 33k, 33l are compressed. As a result, the stress concentrated to base end portions 32d, 33d can be relaxed.

As a result, base end portions 34d-36d of female terminals 34-36 and base end portions 32d, 33d of female terminals 32 and 33 can be prevented from peeling off from the solder portions Q.

Second Embodiment

Figure 9:
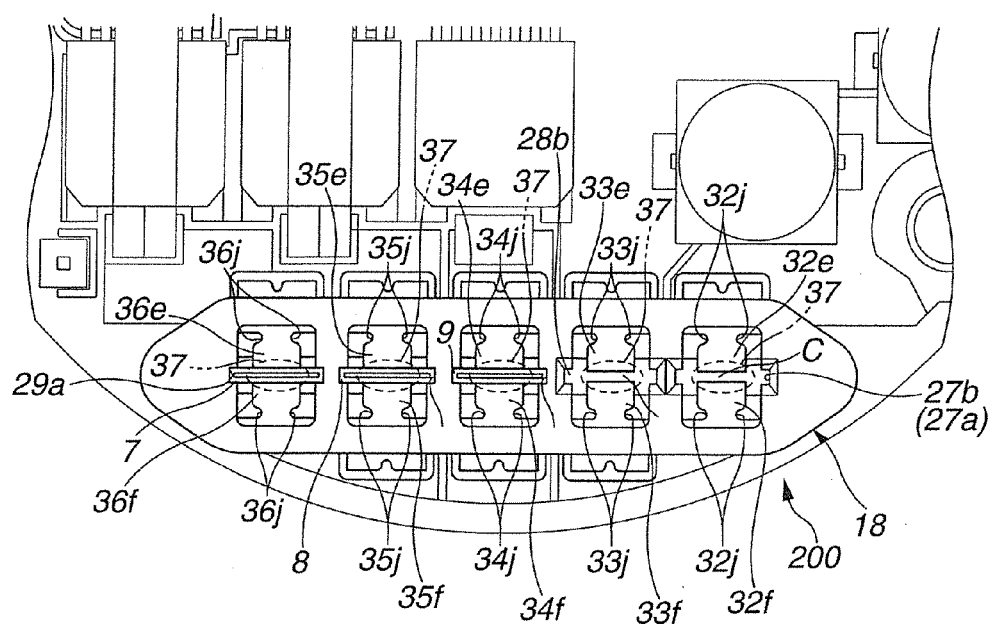
FIG. 9 is a plan view of a terminal holder used in an electric actuator according to a second embodiment of the present invention.

Referring to FIG. 9, an essential part of an electric actuator according to a second embodiment of the present invention is explained. The second embodiment differs from the first embodiment in provision of cutout grooves in opposed tip end portions 32e, 32f to 36e, 36f of split parts 32a, 32b to 36a, 36b of female terminals 32-36 and provision of an adhesive in the vicinity of the clearances C between opposed tip end portions 32e, 32f to 36e, 36f. As shown in FIG. 9, in electric actuator 200 of the second embodiment, semi-circular cutout grooves 32i, 32j to 36i, 36j are formed at both side edges of respective root portions of opposed tip end portions 32e, 32f to 36e, 36f, and exposed into each of through holes 27-31 of terminal holder 18. That is, the root portions are projected from the resin material of terminal holder 18 into respective through holes 27-31.

Adhesive 37 is applied to the vicinity of the respective clearances C between opposed tip end portions 32e, 32f to 36e, 36f of split parts 32a, 32b to 36a, 36b of female terminals 32-36 before three-phase terminals 7-9 and current-carrying terminals 25, 26 are inserted into the respective clearances C.

Specifically, adhesive 37 may be applied so as to fill a whole portion of respective through holes 27-31. In this embodiment, adhesive 37 is applied to the vicinity of the tip end surfaces of opposed tip end portions 32e, 32f to 36e, 36f between which the respective clearances C are formed, as shown in circled regions as indicated by broken line in FIG. 9. Adhesive 37 also may be applied to only a lower surface side of each of opposed tip end portions 34e, 34f to 36e, 36f, i.e., the side where three-phase terminals 7-9 are inserted, and an upper surface side of each of opposed tip end portions 32e, 32f and 33e, 33f, i.e., the side where current-carrying terminals 25, 26 are inserted, before insertion of three-phase terminals 7-9 and current-carrying terminals 25, 26 into the respective clearances C. Alternatively, adhesive 37 may be applied to an upper surface side of each of opposed tip end portions 34e, 34f to 36e, 36f, i.e., the side opposite to the side where three-phase terminals 7-9 are inserted, and a lower surface side of each of opposed tip end portions 32e, 32f and 33e, 33f, i.e., the side opposite to the side where current-carrying terminals 25, 26 are inserted, after insertion of three-phase terminals 7-9 and current-carrying terminals 25, 26 into the respective clearances C.

In this embodiment, adhesive 37 is a thermosetting adhesive and solidifies by heat that is generated in respective terminals 7-9, 25 and 26 due to resistance thereof upon supplying an electric current to respective terminals 7-9, 25 and 26.

Other constructions of the second embodiment are the same as those of the first embodiment. Accordingly, the second embodiment can attain the same function and effect as those of the first embodiment. In addition, in the second embodiment, cutout grooves 32i, 32j to 36i, 36j formed in the both side edges of the respective root portions of opposed tip end portions 32e, 32f to 36e, 36f of split parts 32a, 32b to 36a, 36b of female terminals 32-36 can serve to disperse a stress that is concentrated on opposed tip end portions 32e, 32f to 36e, 36f upon inserting respective terminals 7-9, 25 and 26 into the respective clearances C, and the peripheral portions of cutout grooves 32i, 32j to 36i, 36j can absorb the stress. As a result, it is possible to reduce the stress that is concentrated on the root portions of opposed tip end portions 32e, 32f to 36e, 36f. Further, with the provision of cutout grooves 32i, 32j to 36i, 36j, opposed tip end portions 32e, 32f to 36e, 36f can be more readily flexed in a direction opposite to the insertion direction of respective terminals 7-9, 25 and 26, so that an operation of inserting respective terminals 7-9, and 26 into the corresponding clearances C can be facilitated.

Further, with application of adhesive 37, adhesive 37 can trap a contaminant such as metal powder generated by slide contact of respective terminals 7-9, 25 and 26 with opposed tip end portions 32e, 32f to 36e, 36f upon inserting respective terminals 7-9, 25 and 26 into the corresponding clearances C. Therefore, it is possible to suppress unexpected occurrence of a short circuit on the circuit board due to the metal powder scattered over the circuit board.

Further, since the scattering of contaminant can be suppressed, it is not necessary to previously coat the circuit board with an insulating material, or it is possible to reduce a coating area of the circuit board. As a result, the production cost can be reduced.

The present invention is not limited to the above-described embodiments. A thickness of respective terminals 7-9, 25 and 26 and female terminals 32-36 can be optionally varied in consideration of flexibility thereof. However, in such a case, the thickness W1 of respective terminals 7-9, and 26 must be slightly larger than the width W of the respective clearances C.

Furthermore, the electric actuator of the present invention can be applied to not only the electric power steering apparatus but also an electric power brake and a variable valve operating apparatus for an internal combustion engine.

This application is based on a prior Japanese Patent Application No. 2012-64312 filed on Mar. 21, 2012. The entire contents of the Japanese Patent Application No. 2012-64312 are hereby incorporated by reference.

Although the invention has been described above by reference to certain embodiments of the invention, the invention is not limited to the embodiments described above. Further variations of the embodiments described above will occur to those skilled in the art in light of the above teachings. The scope of the invention is defined with reference to the following claims.

What is claimed is:

1. An electric actuator for a vehicle, the electric actuator including an electric motor as a driving source, the electric actuator comprising:
   a first electric circuit comprising a first connecting terminal; and
   a second electric circuit comprising a second connecting terminal electrically connected with the first connecting terminal,
   wherein the first connecting terminal comprises a tip end portion having a rectangular flat plate shape,
   wherein the second connecting terminal comprises a pair of elastic contact flaps opposed to each other with a clearance, the clearance having a width between tip end surfaces of the elastic contact flaps which is smaller than a thickness of the first connecting terminal,
   wherein the first connecting terminal is retained such that the tip end portion thereof is clamped between the tip end surfaces of the elastic contact flaps of the second connecting terminal by an elastic restoring force of the elastic contact flaps,
   wherein the electric actuator further comprises guides disposed on both sides of the first connecting terminal in a width direction of the first connecting terminal, the guides serving to guide the tip end portion of the first connecting terminal into the clearance between the elastic contact flaps of the second connecting terminal,
   wherein the electric actuator further comprises a terminal holder made of a synthetic resin material, each of the elastic contact flaps of the second connecting terminal comprising a central portion molded in the terminal holder, the tip end surfaces of the elastic contact flaps being opposed to each other in a rectangular prism-shaped through hole formed in the terminal holder, and
   wherein the guides are formed in inner surfaces that define the through hole, the inner surfaces being opposed to each other in a longitudinal direction of the clearance between the elastic contact flaps of the second connecting terminal, each of the guides being in the form of an elongated groove extending along a direction in which the first connecting terminal is inserted into the clearance.

2. The electric actuator as claimed in claim 1, wherein the tip end portion of the first connecting terminal has a first tapered surface on at least one of a pair of side surfaces thereof opposed to each other in a thickness direction of the first connecting terminal, the first tapered surface serving to guide the first connecting terminal into the clearance between the elastic contact flaps of the second connecting terminal.

3. The electric actuator as claimed in claim 2, wherein the tip end portion of the first connecting terminal has a second tapered surface on at least one of a pair of side surfaces thereof opposed to each other in a width direction perpendicular to the thickness direction of the first connecting terminal, the second tapered surface serving to guide the first connecting terminal into the clearance between the elastic contact flaps of the second connecting terminal.

4. The electric actuator as claimed in claim 1, wherein the elastic contact flaps of the second connecting terminal are located in substantially horizontal alignment with each other before the first connecting terminal is inserted into the clearance between the elastic contact flaps of the second connecting terminal.

5. The electric actuator as claimed in claim 1, wherein a pair of cutout portions are formed in both side edges of a root portion of each of the elastic contact flaps of the second connecting terminal.

6. The electric actuator as claimed in claim 1, wherein an adhesive is applied to a vicinity of the tip end surfaces of the elastic contact flaps of the second connecting terminal before the tip end portion of the first connecting terminal is inserted into the clearance between the elastic contact flaps of the second connecting terminal.

7. The electric actuator as claimed in claim 1, wherein an adhesive is applied so as to fill the clearance between the elastic contact flaps of the second connecting terminal, before the tip end portion of the first connecting terminal is inserted into the clearance between the elastic contact flaps of the second connecting terminal.

8. A method of producing an electric actuator for a vehicle, the electric actuator comprising a first electric circuit comprising a first connecting terminal, a second electric circuit comprising a second connecting terminal electrically connected with the first connecting terminal, the second connecting terminal comprising a pair of elastic contact flaps, guides disposed on both sides of the first connecting terminal in a width direction of the first connecting terminal, the guides serving to guide a tip end portion of the first connecting terminal into a clearance between the elastic contact flaps of the second connecting terminal, and a terminal holder made of a synthetic resin material, each of the elastic contact flaps of the second connecting terminal comprising a central portion molded in the terminal holder, tip end surfaces of the elastic contact flaps being opposed to each other in a rectangular prism-shaped through hole formed in the terminal holder, the method comprising:
   a first step of resin-molding the second connecting terminal such that the elastic contact flaps of the second connecting terminal are opposed to each other with the clearance, the clearance having a width between the tip end surfaces of the elastic contact flaps which is smaller than a thickness of the first connecting terminal,
   a second step of filling the clearance with an adhesive; and
   a third step of connecting the first connecting terminal to the second connecting terminal by inserting the first connecting terminal into the clearance filled with the adhesive,
   wherein the guides are formed in inner surfaces that define the through hole, the inner surfaces being opposed to each other in a longitudinal direction of the clearance between the elastic contact flaps of the second connecting terminal, each of the guides being in the form of an elongated groove extending along a direction in which the first connecting terminal is inserted into the clearance.

* * * * *